US009765621B2

(12) United States Patent
Huang et al.

(10) Patent No.: US 9,765,621 B2
(45) Date of Patent: Sep. 19, 2017

(54) SWITCH GAIN SCHEDULED EXPLICIT MODEL PREDICTIVE CONTROL OF DIESEL ENGINES

(71) Applicant: Toyota Motor Engineering & Manufacturing North America, Inc., Erlanger, KY (US)

(72) Inventors: Mike Xuli Huang, Ann Arbor, MI (US); Ilya Kolmanovsky, Novi, MI (US)

(73) Assignees: Toyota Motor Engineering & Manufacturing North America, Inc., Erlanger, KY (US); The Regents of the University of Michigan, Ann Arbor, MI (US)

( * ) Notice: Subject to any disclaimer, the term of this patent is extended or adjusted under 35 U.S.C. 154(b) by 402 days.

(21) Appl. No.: 14/519,760

(22) Filed: Oct. 21, 2014

(65) Prior Publication Data

US 2016/0108732 A1 Apr. 21, 2016

(51) Int. Cl.

| | |
|---|---|
| ***G05D 7/00*** | (2006.01) |
| ***G05D 11/00*** | (2006.01) |
| ***F01B 25/10*** | (2006.01) |
| ***G05B 13/04*** | (2006.01) |

(52) U.S. Cl.
CPC ............ *F01B 25/10* (2013.01); *G05B 13/041* (2013.01)

(58) Field of Classification Search
CPC .............................. F01B 25/10; G05B 13/041
USPC .......................................................... 700/282
See application file for complete search history.

(56) References Cited

U.S. PATENT DOCUMENTS

| | | | | |
|---|---|---|---|---|
| 5,362,917 | A | 11/1994 | Ogawa et al. | |
| 6,826,521 | B1 | 11/2004 | Hess et al. | |
| 8,145,329 | B2 | 3/2012 | Pekar et al. | |
| 8,620,461 | B2 | 12/2013 | Kihas | |
| 2004/0084015 | A1* | 5/2004 | Sun | F02D 35/0007 123/399 |
| 2006/0137347 | A1* | 6/2006 | Stewart | F02D 23/00 60/605.2 |
| 2007/0068159 | A1* | 3/2007 | Ueno | F02D 23/00 60/605.2 |
| 2008/0125875 | A1* | 5/2008 | Stewart | G05B 13/042 700/20 |
| 2011/0264353 | A1* | 10/2011 | Atkinson | F02D 41/1402 701/102 |
| 2012/0059782 | A1 | 3/2012 | Pekar et al. | |
| 2012/0221124 | A1 | 8/2012 | Thiele | |
| 2014/0174414 | A1* | 6/2014 | Huang | F02D 41/0007 123/568.21 |

* cited by examiner

*Primary Examiner* — Ziaul Karim
(74) *Attorney, Agent, or Firm* — Oblon, McClelland, Maier & Neustadt, L.L.P.

(57) ABSTRACT

A method for controlling an internal combustion engine using a controller that controls an air flow path by adjusting at least one of a variable geometry turbine (VGT) and an exhaust gas recirculation (EGR) flow rate during engine operation. The method determines inputs, such as engine speed and fuel rate from the sensor data, and employs a switch based gain-scheduled explicit model predictive controller (MPC) responsive to the inputs to determine the air flow path.

17 Claims, 12 Drawing Sheets

Plant under nominal operating condition

Plant under off-nominal operating condition

SWITCH GAIN SCHEDULED EXPLICIT MODEL PREDICTIVE CONTROL OF DIESEL ENGINES

BACKGROUND

Field of the Disclosure

This application relates to an airflow control into an internal combustion engine. More particularly, the application relates to performing an optimal control of an internal combustion engine using an explicit model predictive controller in combination with a switch gain scheduler.

Description of the Related Art

Air flow control of an internal combustion engine is an important strategy to increase engine performance and fuel economy. This is particularly true with diesel engines. Traditionally, an air flow control strategy is developed using a proportional (P), integral (I), and differential (D) control design. PID control design is focused on nominal engine operating conditions and consequently does not perform effectively under off-nominal conditions. PID is a well-known simple control approach utilized for single input single output (SISO) systems. PID approaches have been extended to multiple-input multiple output (MIMO) systems; however more advanced control techniques are able to deliver better performance, e.g. Model Predictive Controller (MPC). MPCs are popular in the process industry such as in chemical processing technologies and are currently being adopted with limited use in the automotive industry. Internal combustion engines operate under different conditions (e.g., high speed or load vs low speed or load) during their use. Each engine operating condition has an air flow dynamic that necessitates design of multiple controllers. Design and use of multiple controllers trigger problems related to the limited memory of an engine control unit (ECU) and the cost of controller calibration.

SUMMARY

In order to reduce the memory usage and processing time, a Switch Gain Scheduled controller is designed and implemented in conjunction with an explicit MPC.

According to an embodiment, a switch gain scheduler used in conjunction with an explicit MPC makes an off-nominal operating condition resemble a nominal operating condition. The switch gain scheduler changes a controller gain depending on operating conditions.

The forgoing general description of the illustrative implementations and the following detailed description thereof are merely exemplary aspects of the teachings of this disclosure, and are not restrictive.

BRIEF DESCRIPTION OF THE DRAWING

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
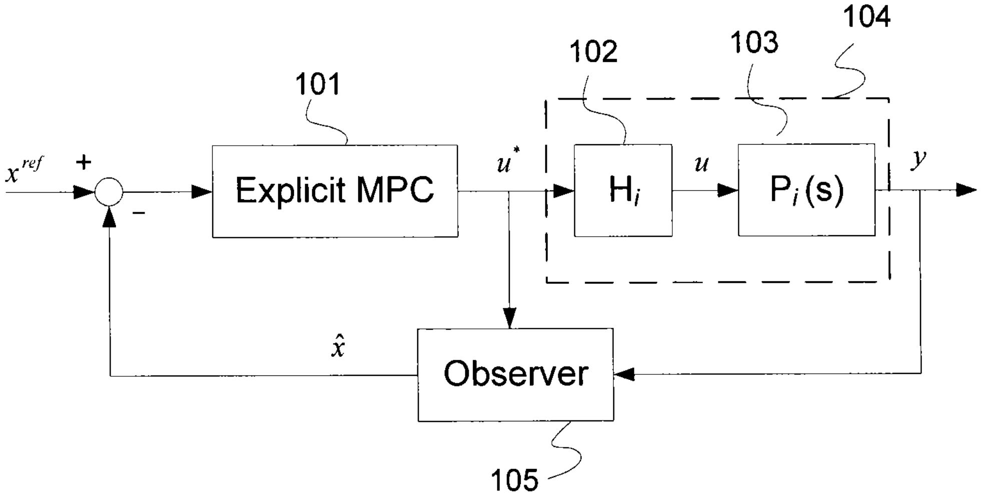
FIG. 1 is a block diagram of the switch gain scheduled explicit model predictive control (MPC) showing an off-nominal plant model coupled with the switch gain scheduler to resemble a nominal plant model.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," and similar terms generally refer to ranges that include the identified value within a margin of 20%, 10% or preferably 5%, and any values there between.

FIG. 1 is a conceptual block diagram of a switch gain scheduled explicit MPC. The switch gain scheduled block 102 is coupled with an off-nominal plant 103 and together they represent a nominal operating plant block 104. The explicit MPC 101 is the primary controller, which provides an optimal control action to the plant in off-nominal condition via the switch gain scheduled block 102. The optimal control action is determined based on the difference between a reference state $x^{ref}$ and an estimated state $\hat{x}$ from an observer 105. The observer 105 implements an algorithm that calculates an estimated plant state from the observed output y of the off-nominal plant and the commanded plant input $u^*$.

The advantage of this embodiment is only one explicit model predictive controller (MPC) may be designed. Hence, the ECU memory usage is significantly reduced in addition to the calibration requirement reduction, while maintaining the performance of the engine such as the diesel engine.

Figure 2:
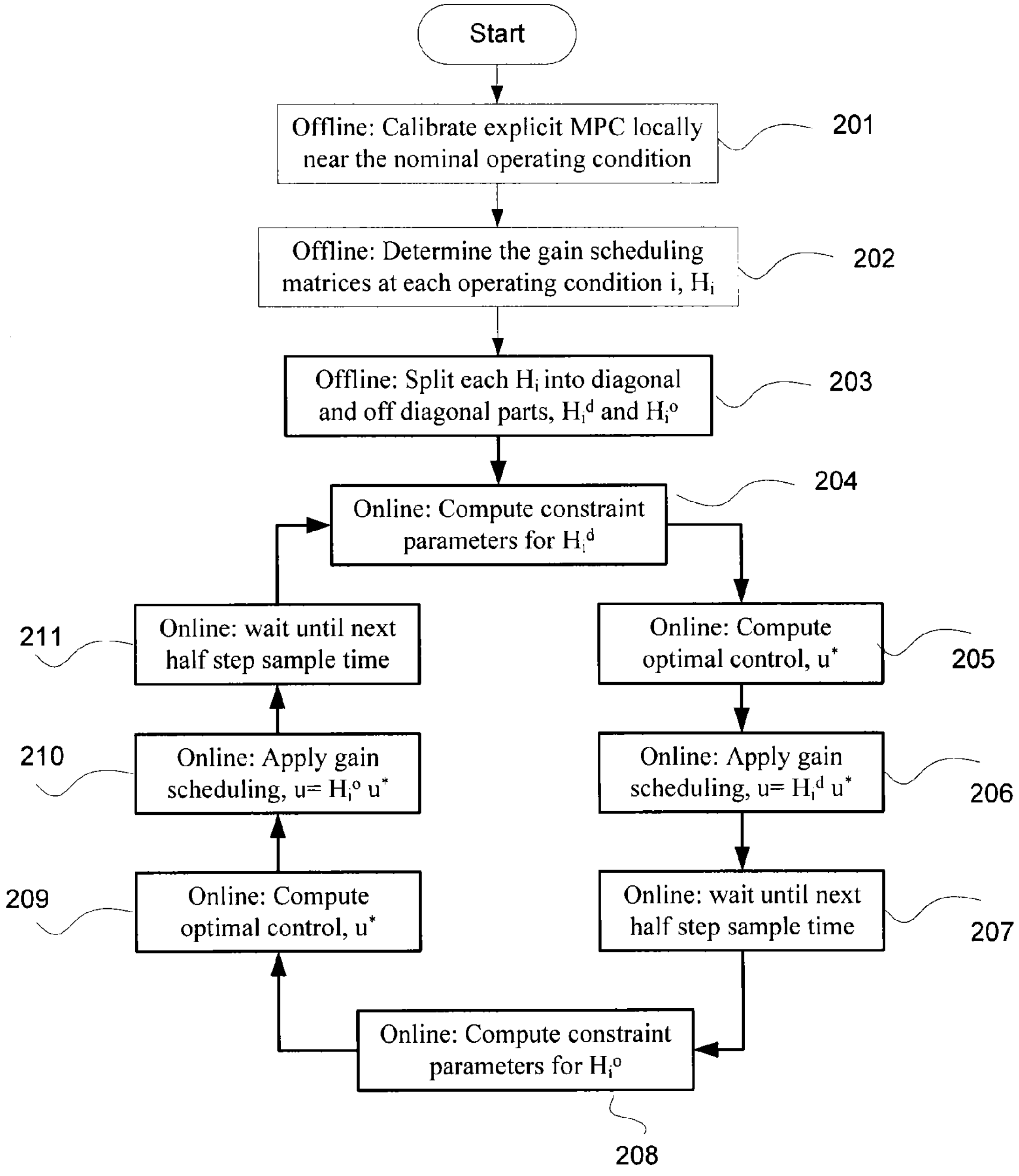
FIG. 2 is an exemplary process of the switch gain scheduled explicit model predictive control.

Referring to FIG. 2, the switch gain scheduled explicit MPC design and implementation and can involve several offline and online processes. First process step 201 is an offline calibration of an explicit MPC near a nominal operating condition. Examples of nominal operating conditions include an engine operating at idle speed, say 800 rpm. Second process step 202 is also offline and involves determination of a gain scheduling matrix for different operating conditions. The first two steps are independent and commonly performed during the control system design. The process steps after 202 determine the optimal control for different operating conditions by applying gain scheduling along with an explicit MPC, defined for nominal operating conditions. In process step 203, an offline process, the gain scheduling matrices $H_i$ are split into diagonal and off-diagonal parts $H_i^d$ and $H_i^o$.

In process step 204, constraint parameters for the scaled plant with $H_i^d$ are computed in real-time online, where i is the operating condition. Next, in process step 205, the diagonal matrix $H_i^d$ is used to determine the optimal control strategy. The optimal control strategy is obtained using the using explicit MPC solver and scaled constraints parameters. In process step 206, the diagonal matrix $H_i^d$ is multiplied to the optimal control action taken by the explicit MPC to calculate a new controlled plant input u. Then the switch gain scheduled explicit MPC waits for the next half step sample time 207.

In the process step 208, constraint parameters for the scaled plant with $H_i^o$ are computed in real-time, where i is the operating condition. In the process step 209, the diagonal matrix $H_i^o$ is used to determine the optimal control strategy. The optimal control strategy is obtained using the explicit MPC solver and scaled constraints parameters. In the process step 210, the off-diagonal matrix $H_i^o$ is multiplied to the optimal control action taken by the explicit MPC to calculate a new controlled plant input u. Then the switch gain scheduled explicit MPC waits for the next half step sample time 211. The processes 204-211 are repeated as the time advances.

The switch gain scheduled explicit MPC is general enough to be applied to any internal combustion engine control system application. In this embodiment, diesel engine air flow control is used as a sample application.

Figure 3:
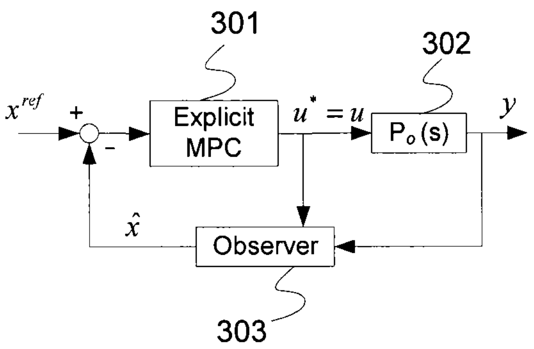
FIG. 3 is block diagram of a standard observer-based feedback controller, where the plant can either be under the nominal condition or under off-nominal operating conditions.
Figure 3:
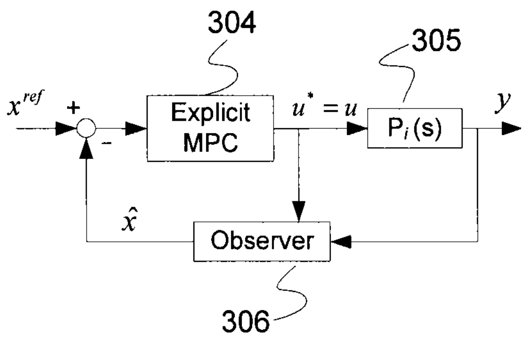

Referring to FIG. 3, consider the nominal plant, $P_0(s)$ 302, which is implemented as a set of linearized equations and off-nominal plant, $P_i(s)$ 305, which is implemented as a set of linearized equations. $P_0(s)$ and $P_i(s)$ result from linearization of a non-linear plant model operating at different operating conditions. The observers 303 and 306 implement the same algorithm, but depending on the control action u* and the state of the plant, the observers provide different output to their respective explicit MPC controller.

Figure 6:
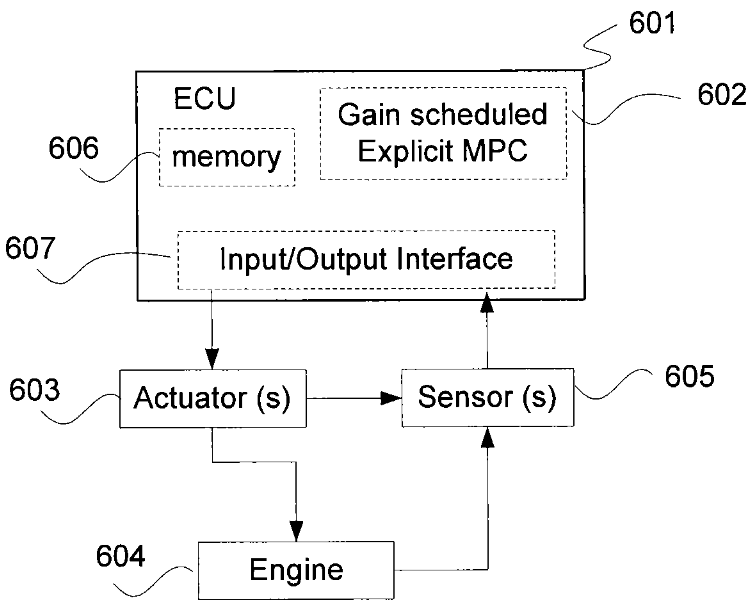
FIG. 6 is schematic representation of an ECU embedded with the switch gain scheduled explicit MPC controller, whose control actions are send to the engine via actuator.

Each of the nominal and off-nominal plants may be controlled by different explicit MPCs 301 and 304, respectively. In case of off-nominal conditions, if there are i different operating condition, then i different MPCs may be implemented, which in turn increases the memory storage and processing requirement of the ECU 601 used for the engine 604 in FIG. 6. Examples of off-nominal operating conditions include low speed or high speed engine condition like 800 rpm or 4000 rpm respectively. Implementing a plurality of explicit MPC in the ECU 601 of an automobile is generally discouraged due to the limited memory and processing capacity of the ECU.

In the present embodiment, the plurality of MPC issue is resolved by designing a single explicit MPC at nominal operating condition and inserting the switching gain scheduler block 102. The switch gain scheduler 102 is coupled with the off-nominal plant model 103 as illustrated in FIG. 1. The coupled blocks within 104, together imitate the behavior of a plant operating under nominal conditions. Hence, only a single explicit MPC operating at a nominal condition needs to be designed.

The design and implementation of a gain scheduler itself is dependent on the type of controller and system dynamics, which include different operating conditions, that render the gain scheduler a specialized module. The present embodiment designs and implements the gain scheduler for an explicit MPC type of controller. In addition, the switch gain scheduler is designed based on splitting the gain matrix $H_i$ into $H_i^d$ and $H_i^o$, where i refers to the operating condition, d denotes the diagonal matrix and o denotes the off-diagonal matrix. The switch gain scheduler defines a switching variable which dynamically switches between the $H_i^d$ and the $H_i^o$ gain matrices.

Figure 4:
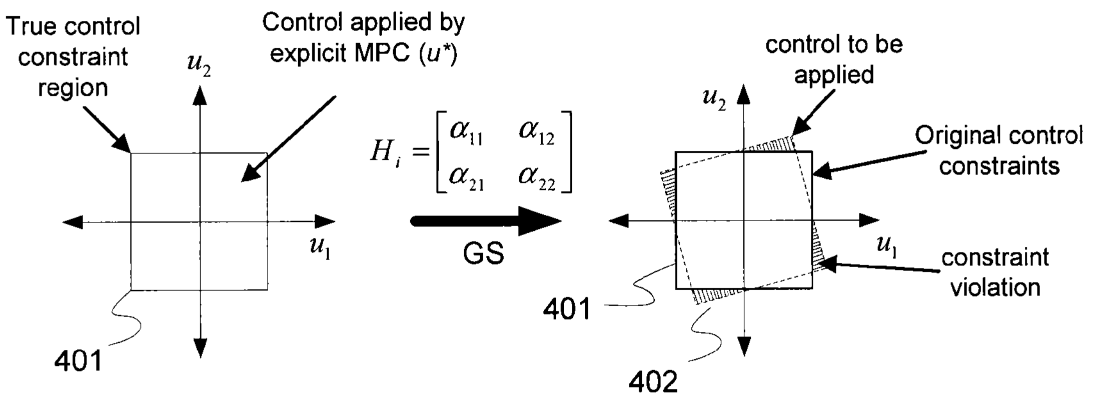
FIG. 4 is an exemplary illustration of the constraints of applying gain scheduling directly.

The basis of splitting the gain matrix $H_i$ is illustrated in FIG. 4. Referring to FIG. 4, the axis $u_1$ and $u_2$ represent the two inputs (e.g., amount of fuel, engine speed) to the controller. The bounded region 401 is an exemplary true control constraint, which must be satisfied by any plant controller. The optimal control (u*) applied by the explicit MPC 401 to a plant falls within the true control constraint 401. Thus the optimal control actions (u*) issued by the explicit MPC controller to the plant should satisfy the true control constraints.

Applying the gain scheduling (GS) matrix $H_i$ in the traditional way transforms the control issued by the explicit MPC. An exemplary transformation 402 shows that the original control constraints 401 are violated (shaded regions).

The mathematical form of the exemplary FIG. 4 is equations (1) and (2). Equation (1) represents the situation when only explicit MPC controls the plant. In equation (1), V is the coefficient matrix of the true control constraint and cannot be changed; u=u* is the plant input matrix; W is the real control constraint matrix as seen by the explicit MPC.

$$Vu \le W \tag{1}$$

Where, $$V = \begin{bmatrix} 1 & 0 \\ -1 & 0 \\ 0 & 1 \\ 0 & -1 \end{bmatrix};\ u = \begin{bmatrix} u_1 \\ u_2 \end{bmatrix};\ W = \begin{bmatrix} u_{max1} \\ -u_{min1} \\ u_{max2} \\ -u_{min2} \end{bmatrix}$$

On applying the gain scheduling after the explicit MPC, equation (1) is transformed to equation (2). The resulting matrix does not fully satisfy the constraints W.

$$VH_iu^* \le W \tag{2}$$

Where, $$H_i = \begin{bmatrix} \alpha_{11} & \alpha_{12} \\ \alpha_{21} & \alpha_{22} \end{bmatrix}$$

When working with explicit MPC, the control constraints restrict one to use special cases of $H_i$ such that the transformation $u=H_i\,u^*$ (refer FIG. 1). In this embodiment, the gain scheduling (GS) is designed such that the original control constraints that are satisfied by explicit MPC are not violated.

Figure 5A:
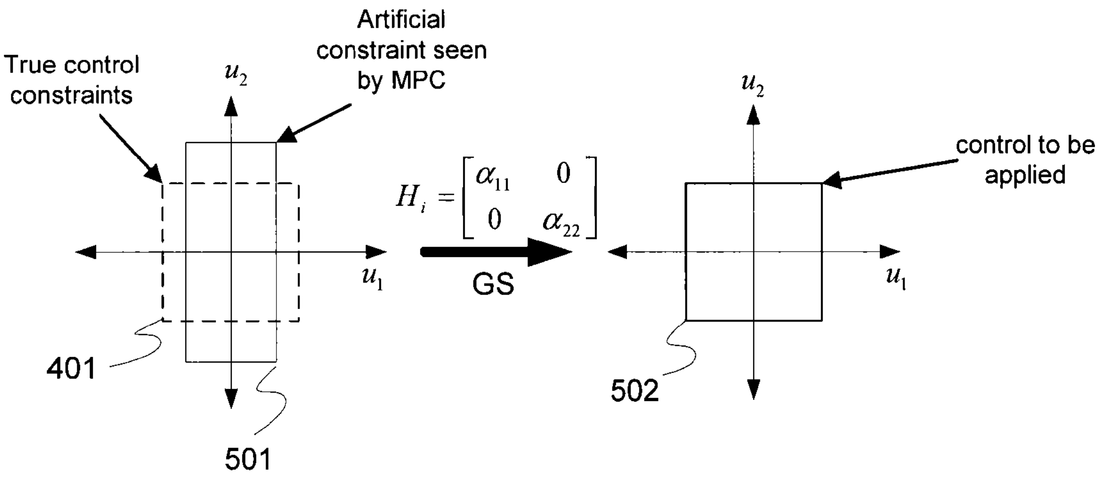
FIGS. 5A and 5B are an exemplary illustration of the solution proposed in this patent to the constraints of switch gain scheduled problem of FIG. 4.
Figure 5B:
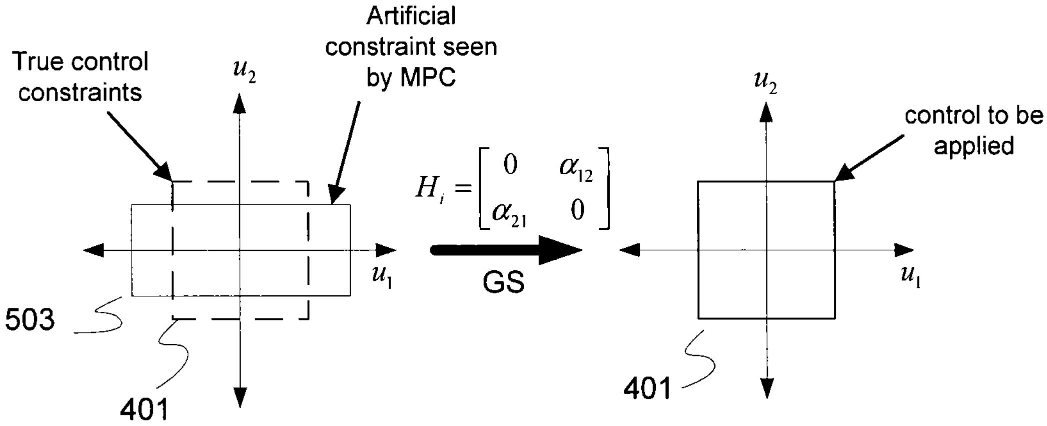

Referring to FIGS. 5A and 5B, the gain scheduling matrix $H_i$ is spilt into two matrices $H_i^d$—composed of the diagonal element of $H_i$ and $H_i^o$—composed of the diagonal element of $H_i$. The gain scheduling algorithm switches between $H_i^d$ and $H_i^o$ based on the sampling time $T_s$. The $H_i^d$ matrix is applied at an even time step, while $H_i^d$ matrix is applied at an odd time step. If the sampling time of the explicit MPC is assumed as $2T_s$, then on average the desired scheduling $H_i$ is achieved.

Referring to FIG. 5A, the control constraints as seen by the explicit MPC (W') 501 are modified and are different from the real control constraint (W) 401. On applying the diagonal gain scheduling $H_i^d$, the real constraints are satisfied.

Referring again to FIG. 5A, the mathematical form of constraints seen by explicit MPC can be written as equation (3):

$$Vu \le W' \tag{3}$$

Where, $$W' = \begin{bmatrix} \alpha_{11}^{-1} u_{max1} \\ -\alpha_{11}^{-1} u_{min1} \\ \alpha_{22}^{-1} u_{max2} \\ -\alpha_{22}^{-1} u_{min2} \end{bmatrix};$$

V and u are same as in equation (1)

On applying the gain scheduling after the explicit MPC, equation (3) is transformed to equation (4). The resulting matrix now fully satisfies the constraints W 401.

$$VH_i^d u^* \le W \tag{4}$$

Where, $$H_i^d = \begin{bmatrix} \alpha_{11} & 0 \\ 0 & \alpha_{22} \end{bmatrix};$$

V and u* are same as in equation (1)

Referring to FIG. 5B, the mathematical form of constraints seen by explicit MPC can be written as equation (5):

$$Vu \le W'' \tag{5}$$

Where, $$W'' = \begin{bmatrix} \alpha_{12}^{-1} u_{max1} \\ -\alpha_{12}^{-1} u_{min1} \\ \alpha_{21}^{-1} u_{max2} \\ -\alpha_{21}^{-1} u_{min2} \end{bmatrix};$$

V and u are same as in equation (1)

On applying the gain scheduling after the explicit MPC, equation (5) is transformed to equation (6). The resulting matrix now fully satisfies the constraints W 401.

$$VH_i^o u^* \le W \tag{6}$$

Where, $$H_i^o = \begin{bmatrix} 0 & \alpha_{12} \\ \alpha_{21} & 0 \end{bmatrix}$$

A mathematical proof illustrating why a gain scheduling method that switches between a gain matrix $H_i^d$ and $H_i^o$ works as well as a full gain scheduling, in which there is no switching between gain matrix, is discussed hereafter. Recall, a switched gain scheduled matrix also satisfies the real control constraints as opposed to a full gain scheduler (see FIG. 4).

A discretized dynamic system employing a full gain scheduling can be represented mathematically as equations 7 and 8.

$$x_{k+1} = Ax_k + BHu_k \tag{7}$$

$$x_{k+2} = A^2 x_k + ABHu_k \tag{8}$$

Where, A and B are system dynamics matrices, H is a full gain scheduling matrix, $x_k$ is the system input at time-step k, and $u_k$ is the controlled plant input at time-step k.

A dynamic system employing a switched gain scheduling can be represented mathematically as equations 9 and 10.

$$\bar{x}_{k+1} = A\bar{x}_k + BH^d u_k \tag{9}$$

$$\bar{x}_{k+2} = A^2 \bar{x}_k + ABH^d u_k + BH^o u_k \tag{10}$$

An error system may be defined as $e_k = x_k - \bar{x}_k$. Then, the error dynamics between a dynamic system employing full matrix scheduling and a dynamic system employing a switched system can be written as equation 11:

$$e_{k+2} = A^2 e_k + (ABH - ABH^d - BH^o)u_k \tag{11}$$

As long as the eigenvalues of A are inside the unit circle, and the control $u_k$ is bounded, the error can also be bounded. Now consider a first order Taylor series expansion of an exponential matrix as given by equation 12.

$$e^{A_c \Delta T} = I + A_c \Delta T + \text{higher order terms} \tag{12}$$

Applying (12) to the discretized equation 11 and assuming $H = H^d + H^o$ we get, $$e_{k+2} = A^2 e_k + \Delta T^2 ABH^o u_k + \text{higher order terms of } \Delta T \tag{13}$$

Note in equation 13, for small sampling period ΔT, the term $\Delta T^2$ A B $H^o$ $u_k$ dominates over the higher order terms of ΔT. As ΔT tends to zero, a switch gain scheduled system approaches the dynamic system under consideration.

Figure 7:
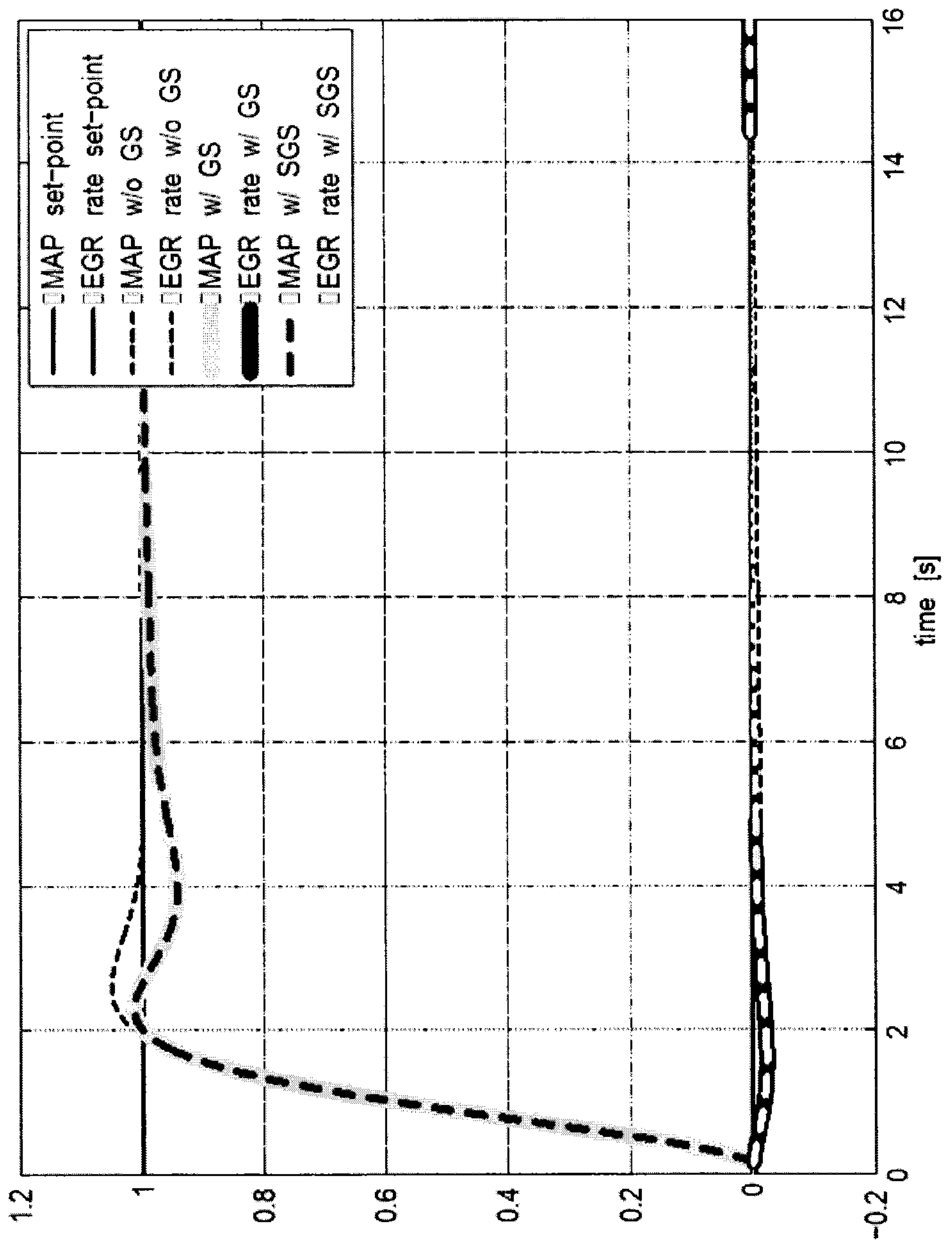
FIG. 7 is a graph depicting the difference in the engine parameter response in case of full gain scheduling and "switched" gain scheduling. The explicit MPC is built using 1600 rpm, and simulated against 4000 rpm model.

The results of sample implementation of the switch gain scheduled explicit MPC for a diesel engine air flow control are shown in FIG. 7-11. FIG. 7 shows a linear simulation showing the use of standard full matrix gain scheduling (GS) versus the switched gain scheduling strategy (SGS). As can be seen, the switching strategy is able to approximately recover the input-output response of using full matrix gain scheduling.

Figure 8:
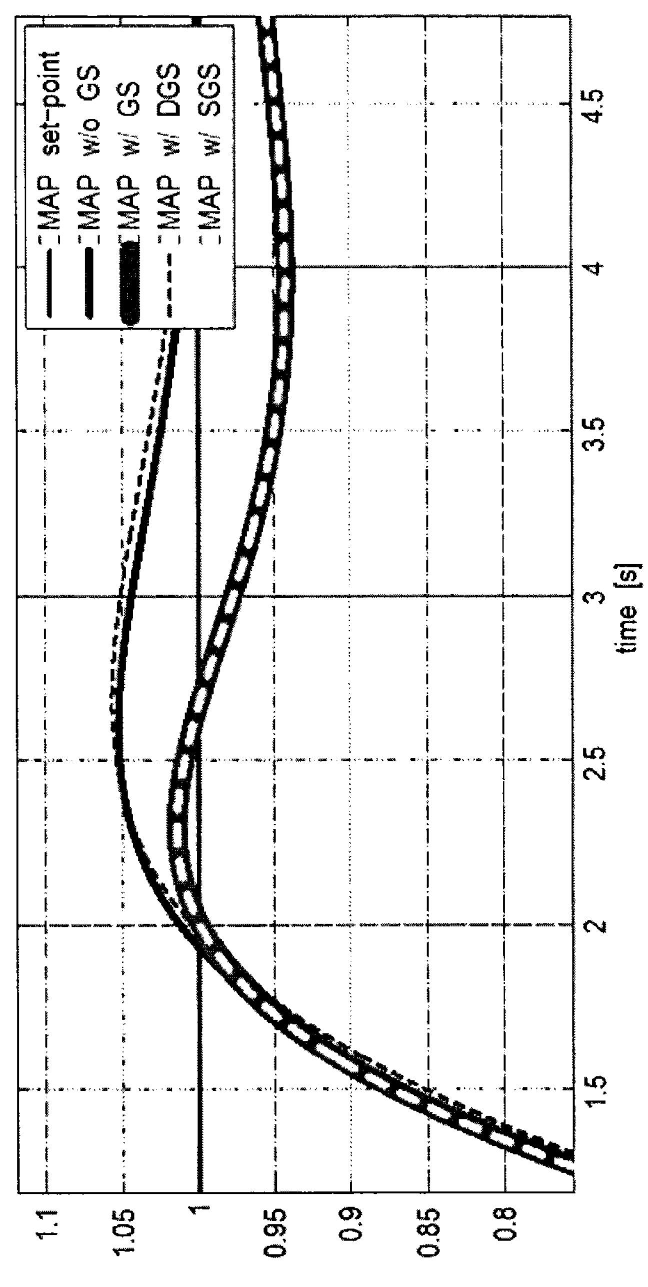
FIG. 8 is a graph depicting the difference in the engine parameter response in case of full gain scheduling, "switched" gain scheduling, and diagonal gain scheduling.

FIG. 8 shows the zoomed in version of simulation in FIG. 7, in addition the purely diagonal gain scheduling is depicted for comparison. FIG. 8 clearly depicts the difference in responses between purely diagonal gain scheduling (DGS) and switched gain scheduling. The switched gain scheduling strategy not only guarantees that the control action is within the real control limits, but also closely follows the full matrix gain scheduling behavior, which does not necessarily satisfy the real control constraints.

Figure 9:
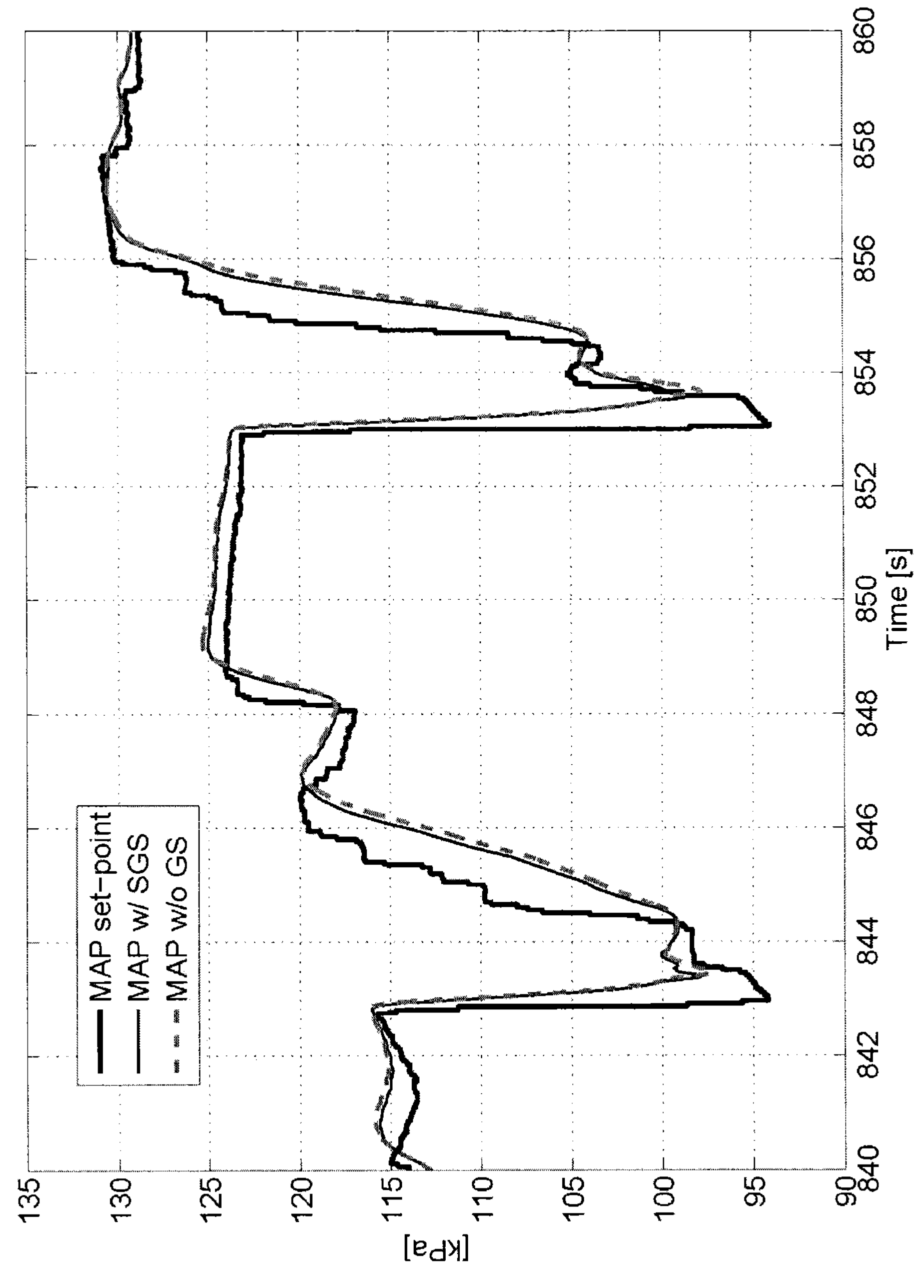
FIG. 9 is a graph depicting the non-linear model simulation of intake manifold pressure (MAP) using "switched" gain scheduling.
Figure 10:
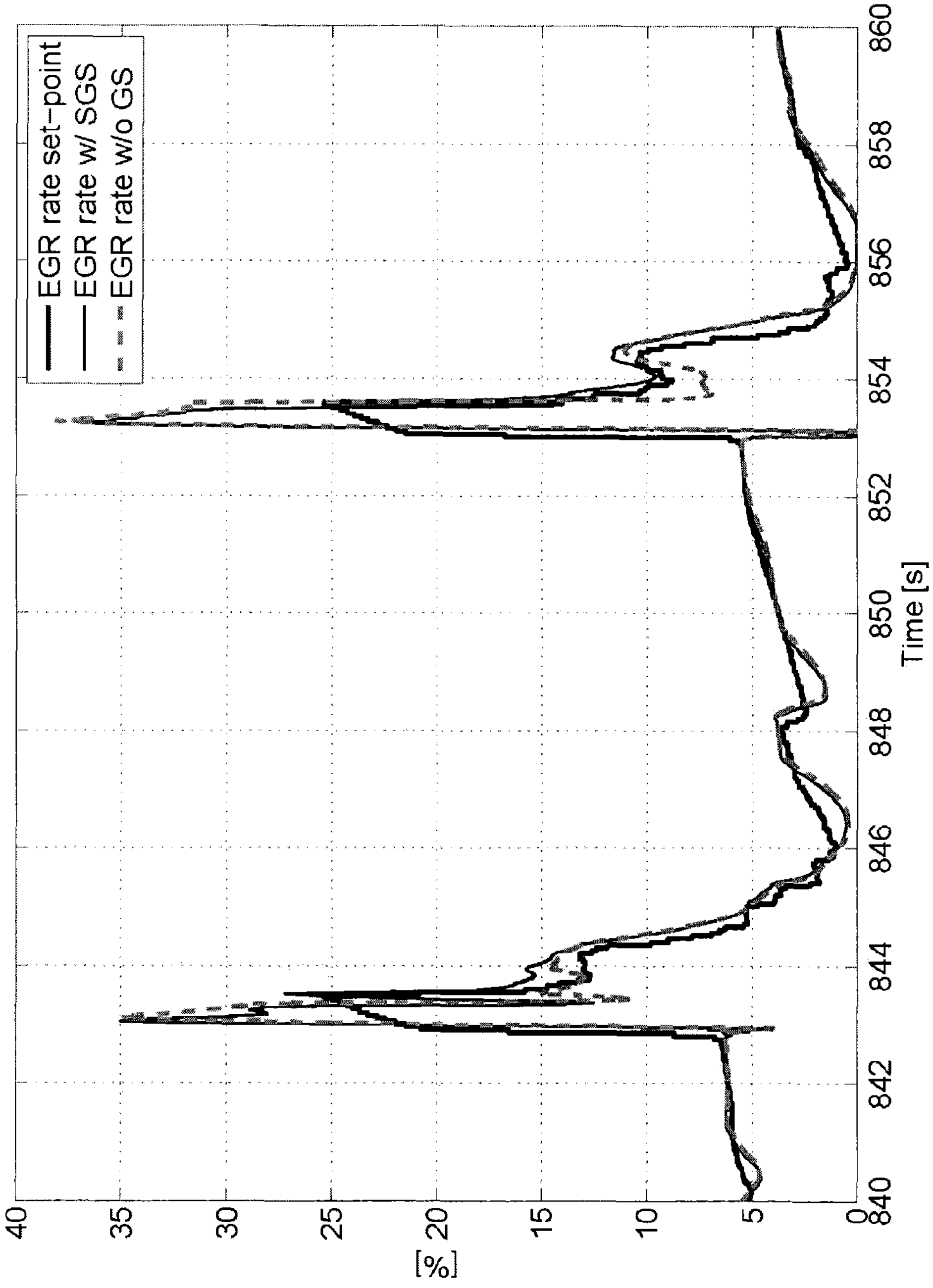
FIG. 10 is a graph depicting the non-linear model simulation of exhaust gas recirculation rate (EGR) using "switched" gain scheduling.
Figure 11:
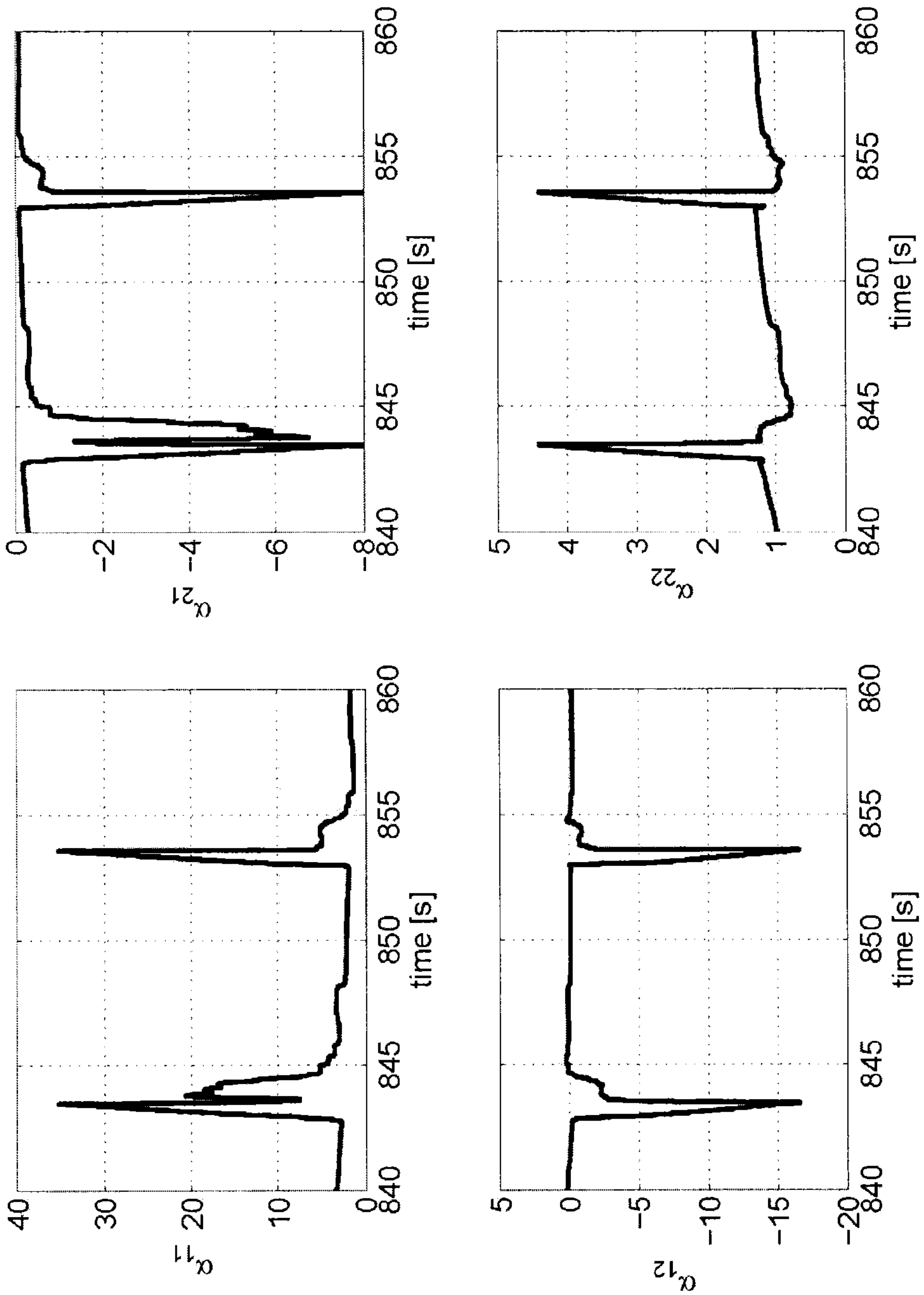
FIG. 11 is a graph illustrating the sample switch gain scheduling matrix to be used at each time-step during the example simulation.

FIGS. 9-11 illustrate the intake pressure, EGR rate responses, and gain scheduling parameters over a portion of the NEDC drive cycle. In particular, FIG. 9 illustrates the effect of the switched gain scheduling strategy on the intake pressure. The response time of the intake pressure is faster by approximately 100 ms on tip-ins compared to the full gain scheduler. A faster intake pressure response may be desirable for faster acceleration and better drivability in general.

FIG. 10 illustrates the effect of a switched gain scheduling strategy on exhaust gas recirculation (EGR) rate measured in gram/sec. The EGR rate closely follows the desired reference, and output is comparable to one obtained from the full gain scheduled controller. In general, a faster EGR response is one of the desired characteristics of internal combustion engine control in order to meet emissions requirements. A higher EGR rate may lead to a lower NOx percentage.

FIG. 11 depicts the diagonal and off-diagonal gain matrix used at each time step during the sample simulation discussed earlier. Referring back to FIG. 6, once the switch gain scheduled explicit MPC controller 602 is designed as summarized in FIG. 2 and detailed herein, all the related algorithms are implemented in the engine control unit (ECU) 601 of engine 604.

An exemplary engine control unit (ECU) such as ECU 601 contains at least one micro-processor or the equivalent, such as a central processing unit (CPU) or application specific processor ASP (not shown), input and output interfaces 607, memory circuit 606 (e.g., ROM, EPROM, EEPROM, flash memory, static memory, DRAM, SDRAM, and their equivalent), power circuitry, and other supporting components. The microprocessor is circuitry that utilizes a computer readable storage medium, such as the memory circuit 606, configured to control the microprocessor to perform and/or control the processes discussed in this embodiment.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalent. The microprocessor can be a separate device or a single processing mechanism. Further, this disclosure can benefit from parallel processing capabilities of a multi-cored CPU. Control circuitry provided by one or more processors in multi-processing arrangement may also be employed to execute sequences of instructions contained in memory. Alternatively, hard-wired circuitry may be used in place of or in combination with software instructions. The exemplary implementations discussed herein are not limited to any specific combination of hardware circuitry and software.

What is claimed is:

1. A method for controlling an internal combustion engine, comprising:

determining inputs to a controller of the internal combustion engine;

determining an airflow path using a switch based gain-scheduled explicit model predictive controller (MPC) and based on the inputs; and adjusting, with the controller, at least one of a variable geometry turbine (VGT) and an exhaust gas recirculation (EGR) flow rate to set the air flow path determined, wherein to determine the airflow path, the switched based gain-scheduled explicit MPC employs a gain scheduled matrix for different engine operating conditions and corresponding air flow dynamics, generates a diagonal matrix by extracting the diagonal elements of a gain scheduled matrix, generates an off-diagonal gain matrix by extracting the off-diagonal elements of a gain scheduled matrix, and stores a diagonal and an off-diagonal gain matrix in memory to be used when demanded.

2. The method of claim 1 wherein the explicit MPC, for a nominal engine operating condition, generates optimal control actions that fall within a real control constraint region.

3. The method of claim 1 wherein the explicit MPC, for a nominal engine operating condition, generates optimal control actions that may fall outside a real control constraint region.

4. The method of claim 3 further comprising:

defining an input constraint matrix for the explicit MPC based on switching between the diagonal and the off-diagonal gain matrix.

5. The method of claim 4 wherein:

switching is applied at an interval of half a sample time used in the explicit MPC; and for an even sample time the diagonal gain matrix is used and for an odd sample time the off-diagonal gain matrix is used.

6. The method of claim 1 wherein the inputs are engine speed and fuel rate.

7. The method of claim 2 wherein the nominal engine operating condition can be selected from combination of conditions such as idle speed, no load, or other designed conditions.

8. The method of claim 3 wherein the nominal engine operating condition can be selected from combination of conditions such as idle speed, no load, idle speed, no load, or other designed conditions.

9. A controller for an internal combustion engine, comprising:

circuitry programmed to determine inputs to the controller, and determine an airflow path using a switch based gain-scheduled explicit model predictive controller (MPC) and based on the inputs, and adjust at least one of a variable geometry turbine (VGT) and an exhaust gas recirculation (EGR) flow rate to set the air flow path determined, wherein to determine the airflow path, the circuitry is further programmed to employ a gain scheduled matrix for different engine operating conditions and corresponding air flow dynamics, generate a diagonal gain matrix by extracting the diagonal elements of the gain scheduled matrix, generate an off-diagonal gain matrix by extracting the off-diagonal elements of the gain scheduled matrix, and store a diagonal and an off-diagonal gain matrix in memory to be used when demanded.

10. The controller of claim 9 wherein the explicit MPC, for a nominal engine operating condition, generates optimal control actions that fall within a real control constraint region.

11. The controller of claim 9 wherein the explicit MPC, for a nominal engine operating condition, generates optimal control actions that may fall outside a real control constraint region.

12. The controller of claim 11, wherein the circuitry is further programmed to:

define an input constraint matrix for the explicit MPC based on switching between the diagonal and the off-diagonal gain matrix that leads to optimal control actions falling back into the real control constraint region.

13. The controller of claim 12 wherein:

switching is applied at an interval of half a sample time used in an explicit MPC; and for an even sample time the diagonal gain matrix is used and for an odd sample time the off-diagonal gain matrix is used.

14. The controller of claim 9 wherein the inputs are engine speed and fuel rate.

15. The controller of claim 10 wherein the nominal engine operating condition can be selected from combination of conditions such as idle speed, no load, or other designed conditions.

16. The controller of claim 11 wherein the nominal engine operating condition can be selected from combination of conditions such as idle speed, no load, or other designed conditions.

17. A system, comprising:

one or more sensors to obtain an internal combustion engine speed and fuel flow rate data; and a controller including a processor configured to:

determine a nominal plant behavior model from an off-nominal plant behavior model using switch gain scheduling, determine an optimal air flow control action for the off-nominal plant by applying the switch gain scheduling in combination with an explicit model predictive controller (MPC) that is designed for nominal plant operating condition, and adjust at least one of a variable geometry turbine (VGT) and an exhaust gas recirculation (EGR) flow rate of the internal combustion engine to set the air flow path determined, wherein to determine the airflow path, the controller employs a gain scheduled matrix for different engine operating conditions and corresponding air flow dynamics, generates a diagonal gain matrix by extracting the diagonal elements of the gain scheduled matrix, generates an off-diagonal gain matrix by extracting the off-diagonal elements of the gain scheduled matrix, and stores a diagonal and an off-diagonal gain matrix in memory to be used when demanded.

* * * * *